United States Patent
Andres

[11] 3,777,625
[45] Dec. 11, 1973

[54] PNEUMATIC SERVOMOTOR

[75] Inventor: Rudolf Andres, Sindelfingen, Germany

[73] Assignee: Daimler Benz Aktiengesellschaft, Stuttgart-Unterturkheim, Germany

[22] Filed: May 14, 1971

[21] Appl. No.: 143,414

[30] Foreign Application Priority Data
May 15, 1970 Germany.................. P 20 23 858.8

[52] U.S. Cl. ...................................... 92/48, 92/99
[51] Int. Cl. ............................................ F01b 19/00
[58] Field of Search ................. 92/48, 99, 101, 102

[56] References Cited
UNITED STATES PATENTS

| | | | |
|---|---|---|---|
| 2,649,843 | 8/1953 | Province | 92/48 X |
| 2,969,776 | 1/1961 | Riester | 92/48 X |
| 3,498,189 | 3/1970 | Andres | 92/99 X |
| 3,625,114 | 12/1971 | Golden | 92/99 X |
| 2,904,068 | 9/1959 | St. Clair | 92/99 X |
| 2,969,776 | 1/1961 | Riester | 121/48 |
| 3,498,189 | 3/1970 | Andres | 92/99 X |
| 3,625,114 | 12/1971 | Golden | 92/99 X |

*Primary Examiner*—Martin P. Schwadron
*Assistant Examiner*—Abe Hershkovitz
*Attorney*—Craig, Antonelli & Hill

[57] ABSTRACT

A pneumatic servo-motor, especially an adjusting motor for flaps or other reciprocable structural parts in motor vehicles, which is equipped with at least one diaphragm closing off a working space for the pneumatic medium and mechanically connected with a shifting rod abutting in the working space against the diaphragm; the diaphragm is provided centrally thereof with a disk-like thickened portion which abuts either directly at the shifting rod extending through the same or abuts at a cylindrical extension provided at the abutment disk for the fastening of the shifting rod and thereby assures an effective seal without any additional means.

1 Claim, 3 Drawing Figures

PATENTED DEC 11 1973  3,777,625

INVENTOR
RUDOLF ANDRES

BY Craig, Antonelli & Hill

ATTORNEYS

PNEUMATIC SERVOMOTOR

The present invention relates to a pneumatic servo-motor, especially to an adjusting motor for valves, flaps, or other structural parts in motor vehicles adapted to move to and fro, which is provided with at least one diaphragm closing off a working space for the pneumatic medium, whereby the diaphragm is mechanically connected with a shifting rod by way of an abutment disk abutting in the working space at the diaphragm.

In pneumatic servo-motors of this type, the sealing of the diaphragm at the shifting rod causes difficulties. Additionally, the durability of the diaphragm is impaired at the same place. Consequently, the present invention is concerned with the task to eliminate these disadvantages with simple means.

The underlying problems are solved according to the present invention in that the diaphragm is provided centrally with a disk-shaped thickened portion which abuts either directly at the shifting rod extending therethrough or at a cylindrical extension provided at the abutment disk for the fastening of the shifting rod.

It is achieved by the disk-shaped thickened portion of the diaphragm in the manner of a bead that the radial forces in the center of the diaphragm are absorbed by a solid, strong rubber part so that they do not destroy the diaphragm. The prestress of the diaphragm with respect to the shifting rod or with respect to the cylindrical extension provided at the abutment disk remains preserved so that also a good seal remains preserved, and more particularly without any additional means.

Accordingly, it is an object of the present invention to provide a pneumatic servo-motor which avoids the aforementioned shortcomings and drawbacks by simple means.

Another object of the present invention resides in a pneumatic servo-motor, especially for actuating flaps or other movable parts in motor vehicles, which is characterized by increased durability of its diaphragm without any substantial increase in cost.

A further object of the present invention resides in a pneumatic servo-motor of the type described above which achieves all of the aforementioned aims and objects by extraordinary simple means, yet assures a reliable seal of the diaphragm with respect to the shifting rod.

These and further objects, features and advantages of the present invention will become more obvious from the following description when taken in connection with the accompanying drawing which shows, for purposes of illustration only, several embodiments in accordance with the present invention and wherein.

Figure 1:
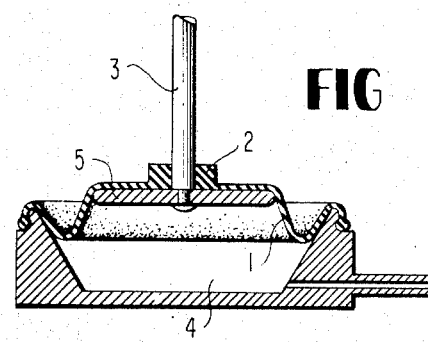
FIG. 1 is an axial cross-sectional view through one embodiment of a pneumatic servo-motor in accordance with the present invention.

Referring now to the drawing wherein like reference numerals are used throughout the various views to designate like parts, and more particularly to FIG. 1, in the pneumatic adjusting motor illustrated in this figure, the diaphragm 1 is provided in the center thereof with a disk-shaped thickened portion 2 in the manner of a bead, which under prestress sealingly abuts at the shifting rod 3 extending through the diaphragm 1 whereby the shifting rod 3 is securely connected with the abutment disk 5 arranged in the working space 4 and abutting at the diaphragm 1.

Figure 2:
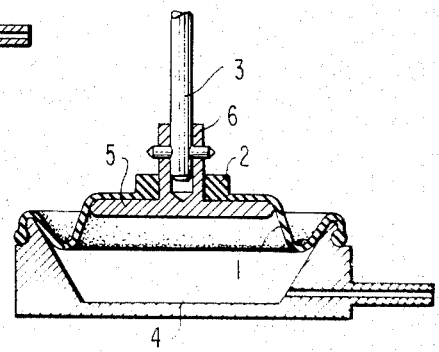
FIG. 2 is an axial cross-sectional view through a modified embodiment of a pneumatic servo motor in accordance with the present invention.

In the case of the pneumatic adjusting motor according to FIG. 2, the abutment disk 5 is provided with a cylindrical extension 6 that is extended through the thickened portion 2 of the diaphragm 1. The shifting rod 3 is securely connected with the extension 6 by conventional means, for example, by a cross-pin. Also, in this embodiment, the durability of the diaphragm 1 is increased by the disk-shaped thickened portion 2 of the diaphragm 1 and a safe and durable seal with respect to the extension 6 is achieved.

Figure 3:
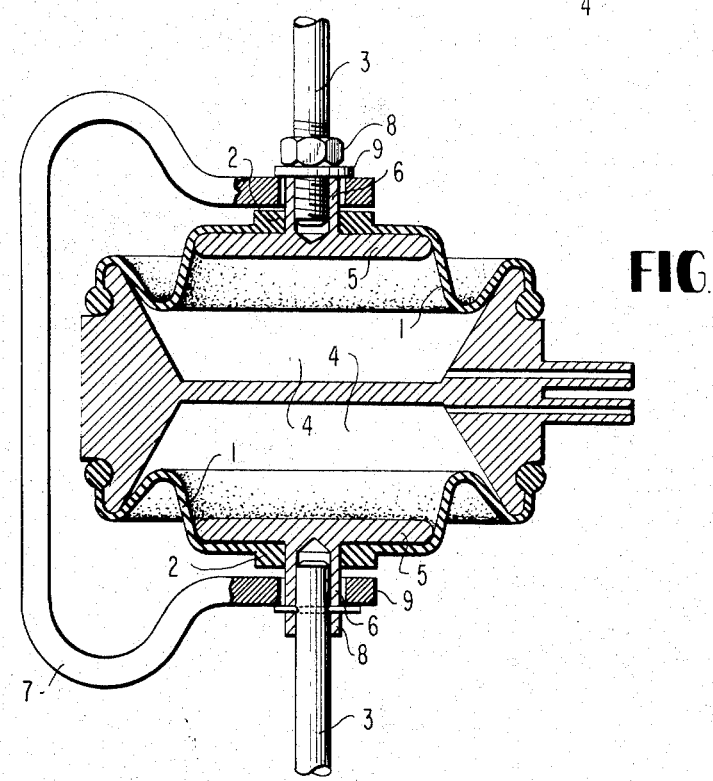
FIG. 3 is an axial cross-sectional view through a still further modified embodiment of a double-acting pneumatic servo motor in accordance with the present invention.

FIG. 3 illustrates a double-acting pneumatic adjusting motor with two working spaces 4 and two diaphragms 1, each of which is provided with a disk-shaped thickened portion 2. Cylindrical extensions 6 are provided at the abutment disks 5 which project through the thickened portion 2 for the fastening of the shifting rods 3 and for the mounting of an entrainment bracket 7. In this embodiment, each shifting rod is threadably secured in a threaded bore of the extension 6 while the eye portions of the entrainment member 7 are held in place about the extension 6 by means of a nut 8 and a washer 9.

While I have shown and described several embodiments in accordance with the present invention, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A pneumatic servo-motor of the double acting type which includes two diaphragm means each provided with a central opening, each closing off a respective working space for a pneumatic medium comprising: a substantially disk-shaped thickened portion on each of said diaphragms extending around the circumference of the central opening exteriorly of the respective working space; a substantially flat disk means provided for each of said diaphragm means, disposed centrally of and abutting each of said diaphragm means in the respective working space, having a cylindrical extension means integral therewith extending through the central opening of the respective diaphragm means; one shifting rod means being mechanically connected with a respective abutment disk means; an entrainment member operatively connecting with each other the two shifting rod means to provide the double acting operation of the pneumatic servo-motor; said entrainment member being provided with two eye portions disposed about said extensions provided on said abutment disk means; and threaded means securing said shifting rod means to said extensions and holding the eye portions in place.

* * * * *